Aug. 17, 1965   G. E. STANTON   3,201,174
SAFETY DEVICE FOR AIRCRAFT WHEELS
Filed June 22, 1959   3 Sheets-Sheet 1
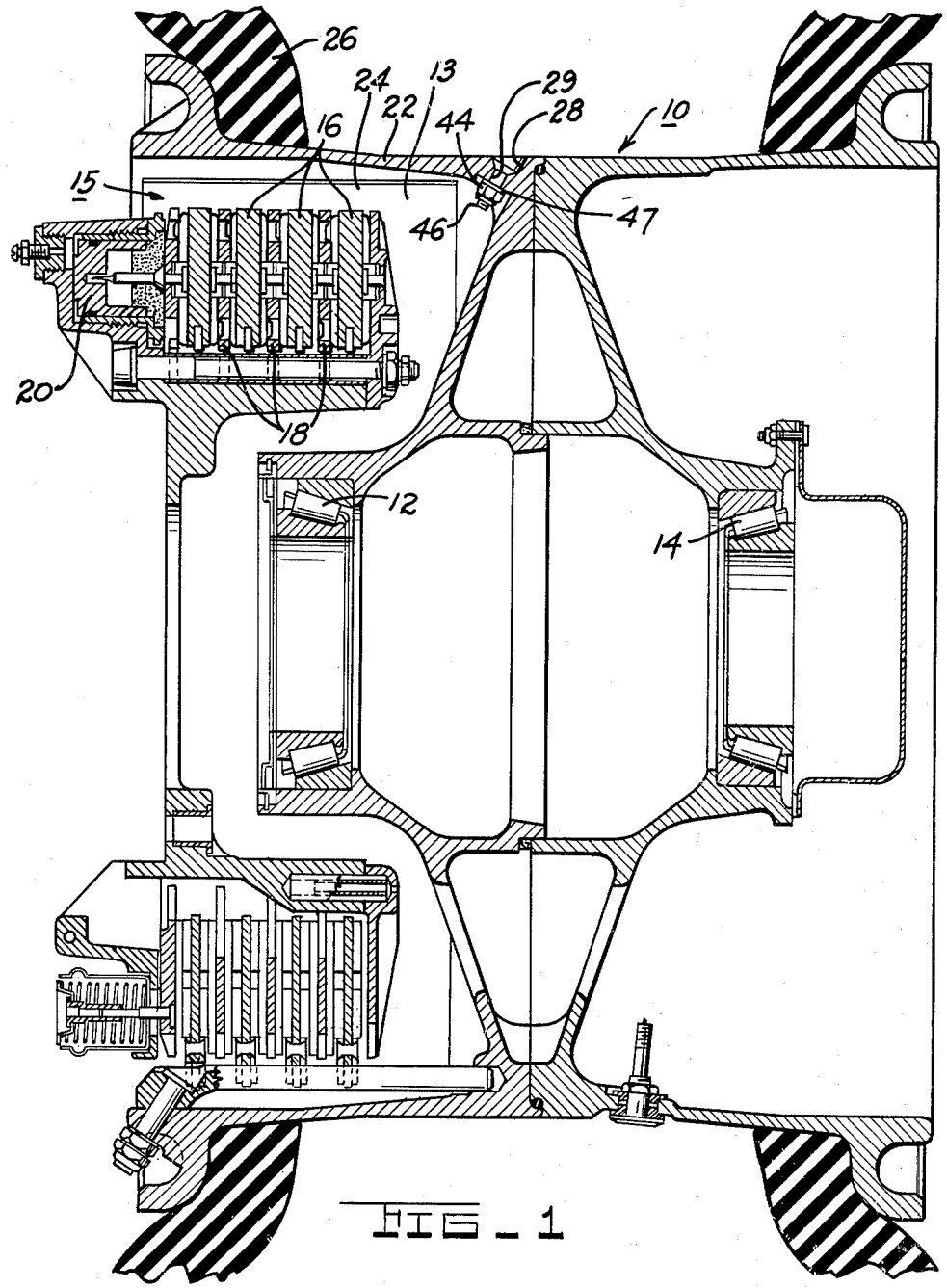
FIG_1
INVENTOR.
GEORGE E. STANTON
BY John A. Young
ATTORNEY.

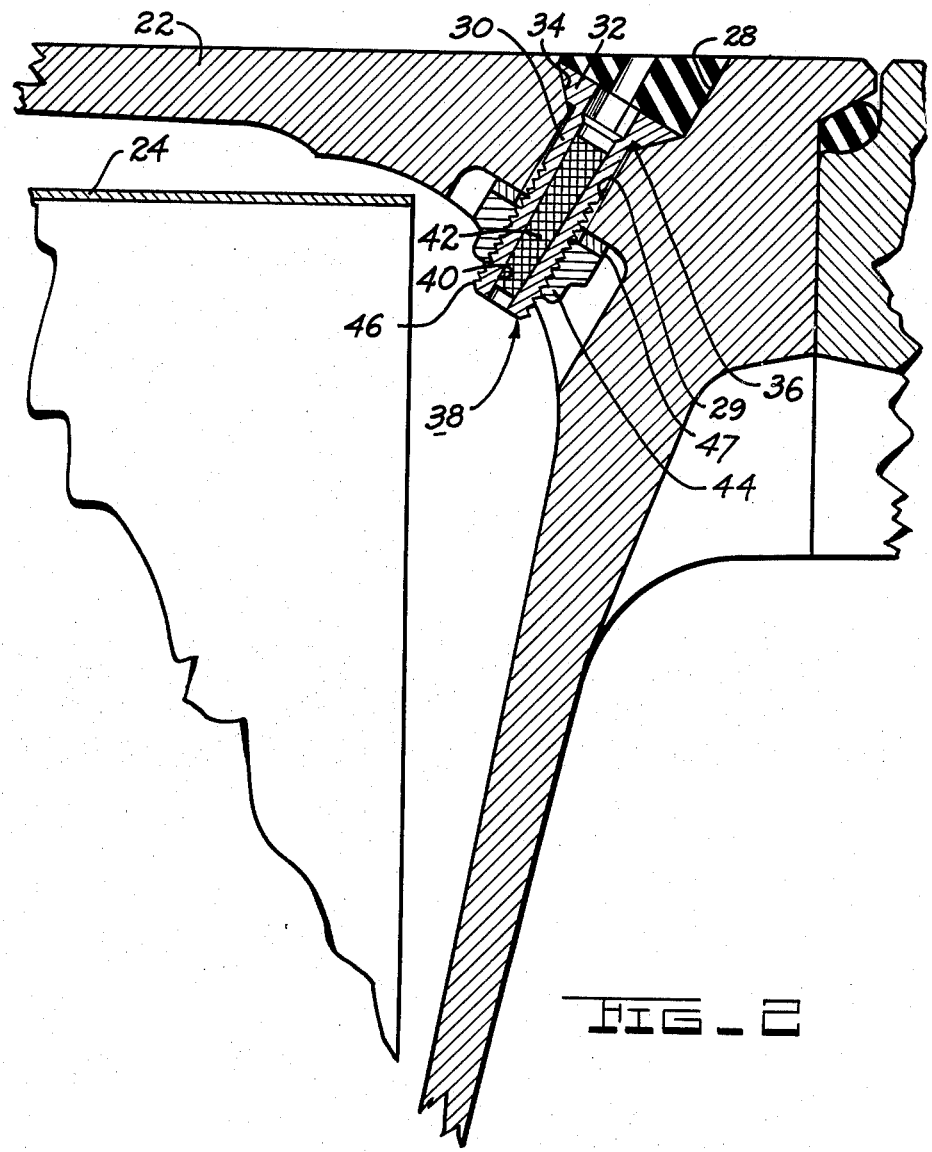

Aug. 17, 1965  G. E. STANTON  3,201,174
SAFETY DEVICE FOR AIRCRAFT WHEELS
Filed June 22, 1959  3 Sheets-Sheet 3
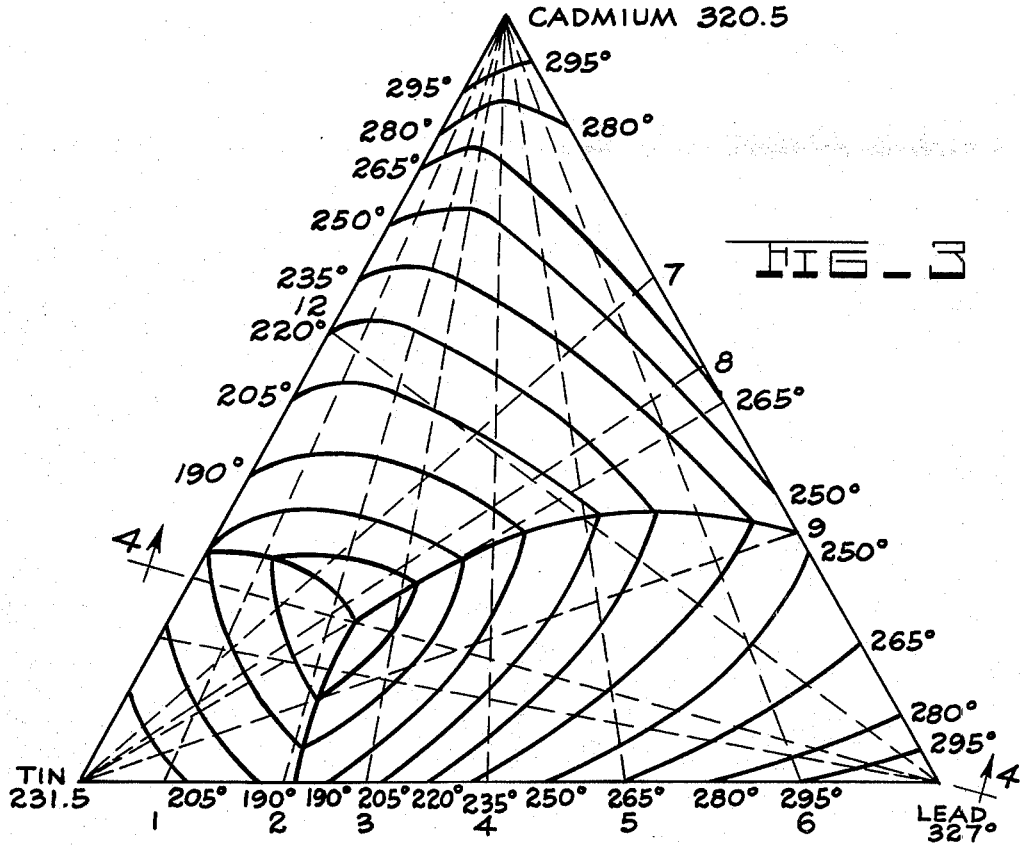
FIG_3
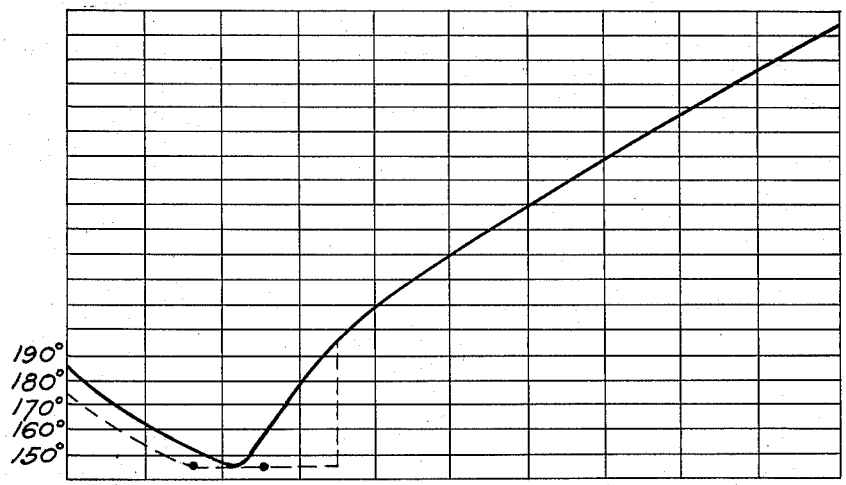
FIG_4
INVENTOR.
GEORGE E. STANTON
BY *John A. Young*
ATTORNEY.

United States Patent Office 3,201,174
Patented Aug. 17, 1965

3,201,174
SAFETY DEVICE FOR AIRCRAFT WHEELS
George E. Stanton, South Bend, Ind., assignor to The Bendix Corporation, a corporation of Delaware
Filed June 22, 1959, Ser. No. 821,754
5 Claims. (Cl. 301—5)

This invention relates to a safety device especially adapted for use with aircraft wheel and brake constructions.

The aircraft wheel includes a pneumatically inflated tire which is an elastomeric material having a tendency to weaken at high temperatures under inflation pressure. As a general rule, tire manufacturers state that blowout of an inflated tire is impending after a temperature of 270° F. is reached in the sidewall core one inch above the wheel flange. This temperature is developed both from the normal flexing of the tire which occurs during take-off and landing and from the braking device which is located within a cavity of the wheel. When the brake becomes overheated because of dragging condition during take-off, repeated hard usage, or "riding" of the brakes during landing, the excessively high braking temperatures contribute to overheating of the tire which becomes weakened and will fail under the inflation pressure.

The tire blowout problem is especially great on "rejected take-offs" where the aircraft has proceeded down the runway and is then braked to reject the take-off. At rejected take-off, the aircraft has reached speeds in the range of 180–210 miles per hour and the heat energy developed in the brake to halt the aircraft produces brake temperatures of about 2,000° F. The energy absorption by the brake is 360% of the normal landing energy. The brake normally does not cool down to half its temperature in less than two hours and thus there is ample opportunity for the braking heat to migrate into the tire causing it to be weakened. If the tire should fail at its inflation pressure of about 165–180 pounds per square inch, it has the explosive force of a 500 pound bomb and can produce severe damage to the skin of the aircraft as well as the engine. Ground maintenance personnel are also exposed to this tire explosion hazard and fatalities have occurred from exploding tires.

It has been found that tire failure will not occur for about ten minutes or so after the brake has been heated so that if a dragging brake condition exists during take-off the overheated brake and wheel when retracted into its well brings a potentially exploding tire next to the cabin wall. If the tire then explodes, it can rupture the cabin which has since been pressurized and thereby produce an explosion of the entire aircraft. From this last statement, it can be appreciated that such conditions are intolerable and, therefore, it is one of the objects of the present invention to obviate the foregoing hazardous conditions by providing automatic venting of inflation pressure at temperatures wherein the tire is subject to failure under inflation pressure.

It is another object of the invention to provide suitable safety devices which are mounted on the aircraft wheel and are operative to perform the described venting function but without weakening the aircraft tire during its normal usage.

It is another object of the invention to provide a safety device which is reusable after it has functioned by merely replacing such fuse material that is expelled to provide venting of the inflation pressure.

A further object of the invention is to provide a safety device which will vent inflation pressure in the tire at whatever temperature is desired according to the strength characteristics of the tire. As a part of this general object it is also intended to provide a slight time delay at the critical temperature before the fuse will function so that the aircraft can taxi, it being understood that the tire can sustain its inflation pressure at and above the critical temperature for a limited period of time, that time being greater than the time delay intervening operation of the fuse.

A further object of the invention is to provide a safety device which operates to relieve the inflation pressure regardless of the position of the tire when it comes to a rolling stop so that localized heating effects within the tire are sensed by the safety device.

Other objects and features of the present invention will become apparent from the following description which proceeds with reference to the accompanying drawings wherein:

FIGURE 1 is a sectional view taken through the diameter of a completed aircraft wheel and brake assembly having the present invention incorporated therein;

FIGURE 2 is an enlarged detail sectional view of the safety device shown in FIGURE 1;

FIGURE 3 is a ternary diagram of the eutectic composition used as the fuse material in the safety device; and, FIGURE 4 is a section view taken on line 4—4 of FIGURE 3 illustrating how the melting point range can be affected by slight changes in composition of the eutectic composition.

Referring now to the drawings and particularly to FIGURES 1 and 2, an aircraft wheel 10 is shown mounted for rotation on spaced bearings 12 and 14, one side of the aircraft wheel 10 having a brake cavity 13 wherein there is mounted the usual aircraft wheel comprising a plurality of interleaved rotors 16 and stators 18 which are frictionally engaged by fluid motors 20. Between the brake 15 and the rim 22 of the wheel 10 is a cylindrical heat shield 24 which serves to reflect at least some of the braking heat away from the tire 26, tending to prevent the braking heat from migrating into the wheel 10 and consequently into the tire 26 which is mounted on the rim 22 of wheel 10.

The invention is especially suited for the tubeless type tire 26 in which inflation pressure is effective directly against the outer surface of the rim 22. Approximately midway between the sides of the wheel are inclined stepped passages indicated by reference numerals 28, 29 in FIGURES 1 and 2. Within passage 29 is a threaded stem 30 having a Phillips head 32 for turning the stem 30 or holding it against turning. The Phillips head 32 is tapered and fits flush against a companion tapered surface 34 of passage 28 to insure good contact providing adequate transfer of heat between the rim 22 and the stem 30. An O-ring seal 36 prevents leakage of inflation pressure through passage 28 around the safety device designated generally by reference numeral 38. The stem 30 has a tapered through passage 40 the larger end of which is exposed to the pneumatic pressure within the tire and a packing 42 of fuse composition material is located within the tapered passage 40 to substantially fill the same.

In this instance the material 42 is a eutectic composition material which is an alloy of tin, lead and cadmium intended to melt or undergo transition from a solidus to liquidus at a temperature of approximately 294° F. (146° C.), this being the eutectic melting point of the ternary composition which is 50% tin, 32% lead and 18% cadmium. The eutectic composition has a sharp transition from the solidus to liquidus state and, therefore, once the fuse material 42 reaches the eutectic melting point temperature it is converted suddenly to the liquidus state and is, therefore, blown out of the tapered opening 40 to vent the pneumatic pressure within the tire, thereby relieving the pressure on the tire so that it will not explode. The 4° taper of passage 40 prevents "creeping" of the fuse material 42 through the passage so that it will not become dislocated under prolonged exposure to the pneumatic pressure. Once the stem 30 is in place, it is locked by a nut 44 which screws over the threaded part 46 of the stem, washer 47 is included to prevent damage to the wheel.

Once the wheel has come to a rolling stop the temperatures around the circumference of the wheel are by no means localized, it being the general rule that the higher part of the wheel is heated to a much greater extent than the lower part as the result of a tendency for heated air to rise under the so-called "chimney" effect. Thus, localized heating at the upper part of the wheel could expose the tire to dangerous overheating while the lower part of the wheel is relatively cool and within a safe temperature range. To provide for this contingency, a number of safety devices 38 can be spaced around the circumference of the tire, and it has been found that three such safety devices which are spaced at 120° intervals is acceptable since a safety device can never be more than 60° from the highest part of the wheel so that it will be exposed to the full or substantially full effect of the braking heat.

If the safety device should become operative to vent pressure from the tire owing to excessive temperatures, it can be reused by simply removing the nut 44, disassembling the tire from the wheel and refilling the tapered passage 40 with a new charge of fuse material 42. Although the stem 30 can easily be adapted for removal without disassembling the wheel, it is more advisable to provide that the fuse cannot be replaced or recharged except by disassembling the wheel for inspection and replacement of the tire.

The stem 30, in order to effect time delay before melting and expulsion of the fuse material, may be constructed of stainless steel material having a nickel content which reduces the conductivity of the stem 30. Ordinarily, since the braking stop lasts only 30 seconds or in that order of time, the fuse material will not reach ambient temperature for about three to five minutes thus allowing ample time for additional taxiing of the aircraft. The tire, on the other hand, will retain inflation pressure without failure for approximately ten minutes so that there is an adequate time interval which provides for taxiing of the aircraft even at the excessive temperature before the fuse will become operative and the time interval has been demonstrated by actual service to be well within the ability of the tire to maintain inflation without bursting or exploding.

It is important that the fuse material 42 will convert from solidus to liquidus within a limited temperature range and such temperature must be closely controlled in order to achieve its necessary end. If the fuse material should melt over a wide range undergoing first a weakening and then failure, it is possible that it will retain enough partial strength even though some melting has taken place to maintain passage 40 closed thereby holding the inflation pressure and causing tire explosion. Accordingly, it is recommended that only such fuse materials be used which exhibit eutectic or eutectic-like properties, i.e. ones having sharply defined melting points at the temperature value selected in accordance with the strength properties of the tire. For example, referring to FIGURE 4, the addition of only a slight amount of lead in the amount of 1% to 2% can cause an appreciable difference in the melting point and produce a mixed phase of liquidus and solidus in the fuse material which has the general effect of weakening rather than completely converting the material from one phase to another. Such non-eutectic compositions are to be avoided for best results.

To prevent the nut 44 from working loose, the stem 30 may include openings to receive wires for holding the nut 44 against turning thereby impairing the pneumatic seal which is maintained by seal 36. Because each device 38 is individually secured by suitable locking means which are removable, it can be separately replaced and serviced. As before mentioned when the wheel comes to a rolling stop, it is quite likely that only one of the safety devices will become operative owing to localized overheating.

Although the present invention has been described in conjunction with only a single selected embodiment, it will be understood that the principles of the invention are capable of general application and that those skilled in the art can be expected to make variations dictated by design requirements. It is intended, therefore, that such deviations and variations as are reasonably expected on the part of those skilled in the art and which incorporate the herein disclosed principles will be included within the scope of the following claims.

What is claimed is:

1. In an aircraft wheel and brake, a wheel rim with a tubeless tire mounted thereon and having a plurality of openings therein which are spaced circumferentially at regular intervals around said rim, a brake cavity at the side of said wheel having said openings, shielding means located between the brake received in said cavity and the undersurface of the rim of said wheel to be a barrier to free transfer of heat between said wheel and brake but providing unlimited access of braking heat to the portion of said rim having said openings, a threaded stem including an enlarged head received in each said opening and held therein, a tapered through passage constructed in each said stem with the larger end thereof opening into the tire mounted in said rim to be exposed to the inflation pressure therein and a smaller end extending away from the tire and subject to atmospheric pressure, a metallic fuse composition forming a core within said passage and having a melting temperature at which said tire is prone to failure under its pneumatic inflation pressure, said fuse composition being expelled under pneumatic pressure to provide deflation of the tire under controlled non-explosive energy release when said melting temperature is reached and sustained over a predetermined period, means for attaching said stem on the aircraft wheel, and sealing means for preventing leakage of inflation pressure through said rim around said stem and effective to sustain inflation pressure at the pressure and temperature at which said fuse material is operative to deflate the tire.

2. In an aircraft wheel having a rim with a tubeless tire mounted thereon and a brake disposed within the confines of said rim, a plurality of spaced fused devices each comprising a stem received through respective companion openings in the rim of the aircraft wheel and located at circumferentially spaced points around said wheel, each said stem having an enlarged head seating in a respective one of said openings and a tapered passage extending longitudinally through said stem and having the larger end thereof opening at the inner surface of said rim to be exposed to the pneumatic pressure in the tire mounted on said aircraft wheel and the smaller end exposed to atmosphere, a metallic composition material of predetermined melting characteristics received in said passage and disposed adjacent the aircraft brake to be subject to the temperature developed in said aircraft wheel and brake assembly and the pressure developed in said tire, said composition having the property of transition from solid to liquid state over a relatively small range of temperature, and a heat shield located between said wheel and brake to provide a thermal barrier therebetween, said heat shield being positioned to be offset relatively to said fuses to expose said fuses to the full heating effect of said brake.

3. In an aircraft wheel having a rim with a tubeless tire mounted thereon and a brake disposed within the confines of said rim, a safety system for deflating the tire to atmospheric pressure and operative at temperatures which weaken the tire causing failure thereof at its inflation pressure, said system comprising a plurality of circumferentially spaced bolts received through companion openings in the rim section of said wheel surrounding said brake, a tapered through passage having the larger end thereof opening at the rim of said wheel and facing the interior of said tire to be exposed to the inflation pressure therein and the smaller end exposed to atmospheric pressure, a charge of material received in said passage to substantially fill the same and being of a eutectic composition wherein said material has a liquidus-solidus transition over a sharply defined melting point range and at temperature values capable of producing tire failure at its inflation pressure, locking means for securing said bolt to said wheel rim, and sealing means for preventing leakage of inflation pressure around said bolt and through the wheel rim at the inflation pressures and temperatures at which said fuse material is expelled.

4. In an aircraft wheel having a rim with a tubeless tire mounted thereon and a brake disposed within the confines of said rim, a safety device responsive to a combination of pressure and temperature to deflate said tire mounted on said rim, said safety device comprising a stem extending through the rim of said wheel, means removably securing said stem in sealing engagement with said rim, means defining a passage extending through the length of said stem and opening at one end to the interior of said tire and at another end to the atmosphere, and a charge of metal eutectic fuse material having a sharply defined melting point range received within said passage and formulated to reach a dischargeable liquid-solid condition under temperature and pressure combination conditions which are productive of tire failure to deflate the tire to atmospheric pressure and within a time period preceding tire burst.

5. In an aircraft wheel and brake, a wheel rim with a tubeless tire mounted thereon and having a plurality of openings therein spaced at regular intervals around the circumference of said rim and located approximately midway between the sides of the wheel and opening into the pneumatically-charged space surrounded by said tire which is mounted on said rim, a plurality of stems each having a through passage therein and received in each of said openings, each said stem including an enlarged head for holding the stem against ejectment by inflation pressure through the companion opening, a fuse material within said through passage of an eutectic composition having a sharply-defined melting point range formulated to melt and be expelled under the inflation pressure to which said fuse material is exposed to vent the inflation pressure to atmosphere and thereby to reduce inflation pressure to atmospheric pressure, said composition having a melting temperature at which said tire is prone to fail under its inflation pressure, and said passage is tapered with the larger end opening into said tire and the smaller end is exposed to atmosphere to prevent creeping of said fuse material under sustained exposure to the inflation pressure therein.

References Cited by the Examiner

UNITED STATES PATENTS

| | | | |
|---|---|---|---|
| 2,048,442 | 7/36 | Frank | 301—6 |
| 2,666,448 | 1/54 | Garretson et al. | 137—74 X |
| 2,866,525 | 12/58 | Bauer | 188—264 |
| 3,157,219 | 11/64 | Dimin et al. | 301—5 |

FOREIGN PATENTS 666,987  2/52  Great Britain.

ARTHUR L. LA POINT, *Primary Examiner.*

RICHARD A. DOUGLAS, JACOB A. MANIAN,
*Examiners.*